March 25, 1952  H. M. STEPHENSON  2,590,800
VARIABLE-SPEED TRANSMISSION
Filed Jan. 17, 1950
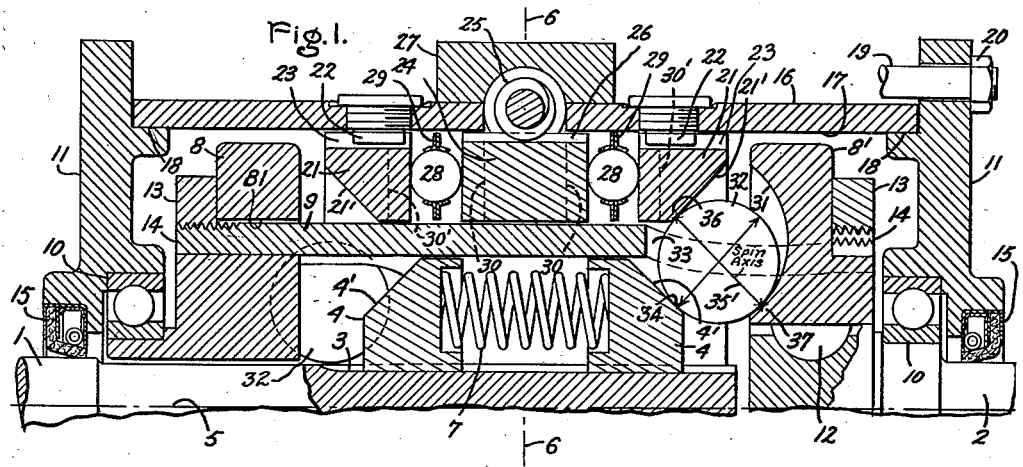
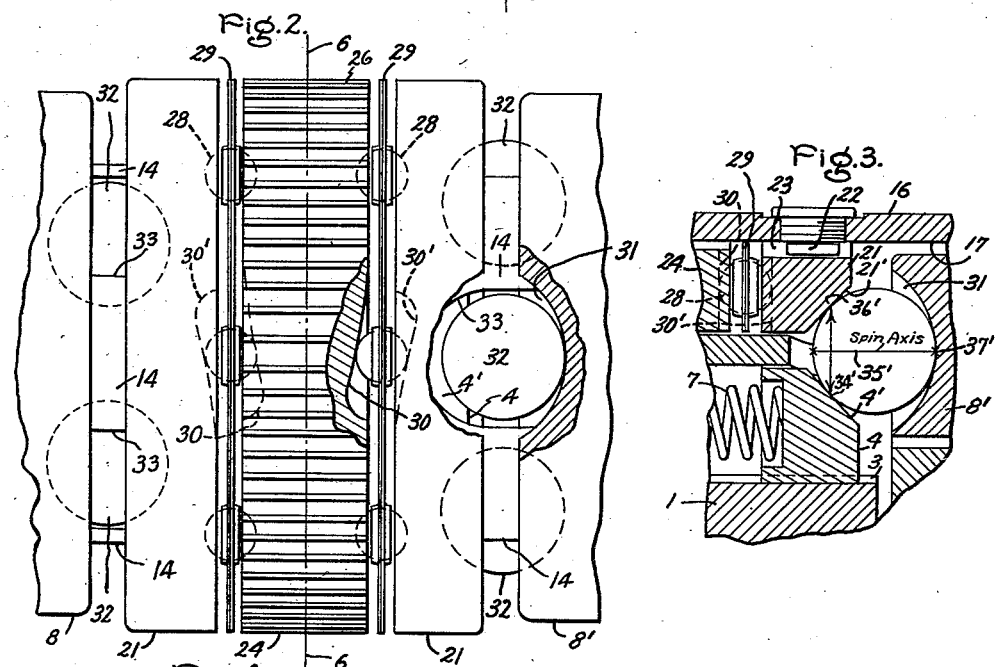
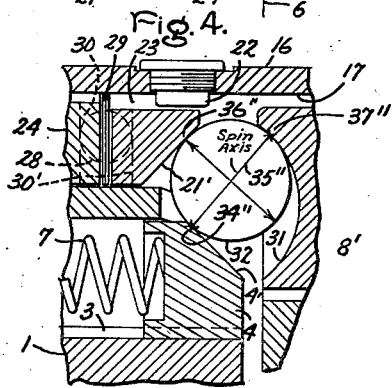
Inventor:
Hugh M. Stephenson
by Ernest F. Britton
His Attorney.

Patented Mar. 25, 1952

2,590,800

UNITED STATES PATENT OFFICE 2,590,800

VARIABLE-SPEED TRANSMISSION

Hugh M. Stephenson, Fort Wayne, Ind., assignor to General Electric Company, a corporation of New York Application January 17, 1950, Serial No. 138,993

1 Claim. (Cl. 74—796)

This invention relates to variable speed devices of the type wherein power is transmitted at desired ratios by a plurality of caged balls rolling under pressure between two or more races of variable peripheries.

Devices of this type are well-known and it is the principal object of this invention to provide a new and improved form of such a device wherein speed changes may be smoothly, continuously and conveniently made over a relatively wide speed range. In one form of the invention the transmission speed ratio is automatically adjusted in response to the torque requirements of a driven load.

The invention will be better understood from a consideration of the following description taken in connection with the accompanying drawings. In the drawings, Fig. 1 is a partial longitudinal cross section of a variable speed transmission constructed in accordance with the invention; Fig. 2 is a side elevational view, partly broken away, of certain elements shown in Fig. 1; and Figs. 3 and 4 show the operating positions of certain elements of Fig. 1 for various speed transmission ratios.

Referring now to Fig. 1, there is shown a variable speed transmission having an input shaft 1 and an output shaft 2. The transmission is generally symmetrical about longitudinal axis 5 and accordingly only the portion of the transmission above axis 5 is shown in Fig. 1. Shaft 1 is intended to be the extension of a shaft of a source of driving power such as a motor (not shown) and accordingly shaft 1 is suitably supported by bearings (not shown) which are external to the variable speed transmission. Output shaft 2 is adapted to drive a load device (not shown). The general function of the variable speed transmission which is interposed between shafts 1 and 2 is to vary the speed ratio therebetween.

Shaft 1 is provided with an externally splined portion 3 which carries a pair of driving races 4 internally splined to mate with spline 3. The transmission is further generally symmetrical, with the exception of constructional details of input shaft 1 and output shaft 2, about a plane 6 normal to axis 5 and appearing as a vertical center-line 6 in Fig. 1. Driving races 4 which are oppositely positioned with respect to plane 6 are slidable with respect to splined portion 3 of shaft 1 and tend to be forced apart by a plurality of helical compression springs 7. By this construction, the pressure on the driving races 4 is identical and no end thrust is placed on the driving shaft.

A pair of driven cages 8 and 8' are solidly linked together by a torque tube 9 and the assembled combination is supported on a pair of bearings 10 positioned in a pair of end flanges 11 which form a portion of the casing of the transmission. Output shaft 2 is secured to cage 8' by the use of a key 12 so that shaft 2 rotates with the assembly of cages 8 and 8' and tube 9. The ends of tube 9 are slotted to form a plurality of equally spaced projections 14 defined by walls 33. The slots between adjacent projection 14 provide cavities to accommodate the driving balls 32. The projections 14 are positioned in slots 81 formed in cages 8 and 8'. The outer peripheral surfaces of projections 14 are threaded and the assembly is secured by nuts 13.

End flanges 11 are connected together by an outer casing 16 having a generally cylindrical inner surface 17. Surface 17 is maintained in a concentric relationship with axis 5 by a pair of rabbets 18 forming part of end flanges 11. The assembly of end flanges 11 and casing 18 is suitably clamped together by a plurality of studs 19 and nuts 20. A pair of oil seals 15 are positioned in end flanges 11 to prevent outward leakage of oil around shafts 1 and 2.

A pair of outer or control races 21 are supported on inner surface 17 of casing 16. Races 21 are free to move axially along inner surface 17 but are restrained from rotational movement by a plurality of studs 22 threadedly engaged in casing 16 and arranged for sliding engagement with a plurality of axial slots 23 in the outer peripheries of races 21. As in the case of races 4, races 21 are oppositely positioned with respect to plane 6. An intermediate adjuster ring 24 is supported on the inner surface 17 of casing 16 and is positioned symmetrically between races 21. Adjuster ring 24 is rotatable about axis 5 and is employed in the adjustment of the speed ratio of the transmission as will be more fully described hereinafter. Rotation of ring 24 is effected by an adjusting screw 25 threadedly engaged with a hobbed portion 26 on the periphery of ring 24. Screw 25 is journaled in a block 27 suitably fixed to casing 16. Screw 25 may be rotated by any suitable external turning device (not shown), such as a crank.

Attention is now directed to Fig. 2 which is a view of certain of the elements of the variable speed transmission without outer casing 16. In particular, adjuster ring 24 including hobbed portion 26 thereof, outer races 21 and driven cages 8 and 8' are shown in the same relative positions as in Fig. 1. In the spaces between ring 24 and outer races 21 are provided two assemblies of adjuster balls each assembly comprising a plurality of balls 28 equally spaced by a cage 29. Adjuster ring 24 and races 21 are provided with a plurality of mating cam surfaces 30 and 30', respectively, which are most clearly shown in Fig. 2 and with which adjuster balls 28 are arranged to engage. Cam surfaces 30 and 30' may be conveniently formed by milling. Since rotation of outer races 21 is prohibited by the engagement of studs 22 with axial slots 23 formed in the outer periphery of the races 21, the rotation of adjuster ring 24 causes the distance between races 21 to be varied. The manner in which this adjusting action effects the operation of the variable speed transmission will be more fully explained hereinafter.

Driven cages 8 and 8' are provided with a plurality of sockets 31, defined by concave surfaces, which may be conveniently termed "spin sockets," and in each of these sockets is positioned a driving ball 32. As will be seen in Fig. 1, driving balls 32 contact simultaneously sockets 31 of driving cages 8 and 8' and race surfaces 4' and 21' respectively of races 4 and 21.

Sockets 31 are preferably symmetrically spaced about the axis of cages 8 and 8'. For convenience the two sets of driving balls 32 in the transmission may be angularly offset with respect to each other and thus in Fig. 1 there is shown a ball 32 at the right of plane 6 which lies in the plane of the sectional view shown in Fig. 1, while the ball at the left of plane 6 lies behind the plane of the sectional view shown in Fig. 1.

Rotation of driving shaft 1 by the source of driving power causes rotation of driving races 4 which are free to slide on spline 3 and are forced in contact with balls 32 by springs 7. Balls 32 are further forced in contact with spin sockets 31 and outer races 21, the exact position of balls 32 depending on the axial position of races 21 with respect to the vertical center line 6. While the surfaces 4' and 21' of races 4 and 21 respectively, which engage balls 32, may be provided with various annular curvatures, a convenient surface to employ is a simple conical surface as shown in Fig. 1.

As previously mentioned the position of races 21 is adjustable by action of adjuster 24 and adjuster balls 28. Rotation of screw 25 by external means causes corresponding rotation of adjuster 24 on surface 17. By rotating adjuster 24, balls 28 may be caused to occupy various positions on cam surfaces 30 and 30', causing races 21 to be moved inwardly or outwardly with respect to plane 6 depending on the direction of rotation of adjuster 24. Such variation in the position of races 21 varies the radius of the circle described by the rotation of the balls 32 about axis 5.

In Fig. 1 races 21 are positioned in their maximum outward position with respect to plane 6 and in this condition the transmission is adjusted for a theoretical infinite ratio or in other words, the driven cages are not rotated by action of driving balls 32 and the speed of output shaft 2 is zero. In practical cases it may not be convenient to obtain such a ratio due to excessive pressures in the driving balls and races, but this condition is shown by way of example since it represents an extreme position of driving balls 32 with respect to spin sockets 31 and races 4 and 21.

Since balls 32 are generally similar, operation of the transmission may be described in terms of a single ball. As race 4 rotates, contact is made with ball 32 at a roll point 34 causing the ball to roll on surface 4' and rotation of ball 32 is effected about a spin axis 35 passing through the center of ball 32 and contact point 37 of spin socket 31. The speed of rotation of ball 32 is determined by the radius thereof and the radius of driving race 4 at point 34. It will be noted that since ball 32 is physically confined in spin socket 31 by reason of the compression of springs 7 which resist the tendency of the balls 32 to roll out of the concave socket 31 and thereby prevent contact between the balls 32 and the walls 33 of the projections 14, rolling action of ball 32 relative to driven cage 8' may not occur. It is a basic characteristic of this device that the spin axis of the balls 32 always pass through the center of the balls 32 and their point of contact with the concave socket 31. Under the conditions shown in Fig. 1, ball 32 rolls relative to driving race 4, but spinning engagement is effected thereby with intermediate race 21 and spin socket 31. There is no tendency, therefore, for cage 8' and shaft 2 to be driven by ball 32 and driven cage 8' is effectively locked to the restrained outer race 21.

Referring now to Fig. 3, ball 32 is shown at the mid-position of its adjustment. More particularly, the spacing of control race 21 and adjuster 24 is diminished by rotation of adjuster 24 and the repositioning of adjuster balls 28 in mating cam surfaces 30 and 30'. Thus, the point of contact 36' of ball 32 with race surface 21' is moved radially outward from shaft 5. Ball 32 contacts spin socket 31 at point 37' which in the arrangement of Fig. 3 is the mid-point of socket 31. Driving race 4 is maintained in contact with ball 32 at point 34' by springs 7 and therefore as driving race 4 is rotated, ball 32 is caused to roll relative to race 4 at point 34' and race 21 at point 36'. Rotation of ball 32 occurs about a spin axis 35' passing through the center of ball 32 and contact point 37'. Again ball 32 is in spinning engagement with socket 31 and rolling engagement with driving race 4, but it will be noted that there is rolling engagement between ball 32 and race 21 rather than spinning contact as in the case of Fig. 1. Spin axis 35' is now parallel with main axis 5.

The rotational speed of ball 32 about spin axis 35' is determined by the radius of driving race 4 at point 34' and the effective radius of ball 32 from point 34' to spin axis 35'. Balls 32 are further caused to rotate in their respective groups about main axis 5, in the well-known manner of planetary gearing and since balls 32 are restrained by sockets 31, driven cages 8 and 8' are caused to follow the balls 32 revolving around main axis 5. Under the condition shown in Fig. 3, driven cages 8 and 8' rotate at a lower speed than driving races 4 or, in other words, a speed reduction is effected in the transmission between the driving races and driven cages and, accordingly, between the input and output shafts. By rotating adjuster 24 so that the balls 32 assume positions intermediate those illustrated in Figs. 1 and 3, it is apparent that intermediate speed reduction ratios can be affected.

Referring now to Fig. 4, control race 21 is shown adjusted to its maximum inward position with respect to adjuster 24. This adjustment is effected by further rotating adjuster 24 to permit adjuster balls 28 to contact the deepest portion of mating cam surfaces 30 and 30'. In Fig. 4 the conditions shown in Fig. 1 are in one sense reversed in that ball 32 now spins at an extreme outward point 37'' in socket 31. Ball 32 contacts control race 21 at point 36'' and driving race 4 at point 34''. While there is a tendency for driving race 4 to cause ball 32 to roll about an axis intersecting the center of ball 32 and point 36" on race 21, such rotation requires rolling action of ball 32 relative to driven cage 8'. Since ball 32 is confined in socket 31 and is limited at all times to spinning action relative to cage 8', rotary motion of driving race 4 causes rolling action of ball 32 relative to control race 21 at point 36". Such rolling action causes rotation of ball 32 about a spin axis 35" between points 34" and 37" on race 4 and socket 31, respectively. Under this condition driving race 4 is effectively locked to spin socket 31 and therefore driven cage 8' rotates with driving race 4 at the driving speed thereof. The speed transmission ratio is, therefore, one-to-one, or in other words a "straight-through" drive is provided.

It will thus be seen that the invention provides a variable speed transmission having a speed range varying from one-to-one to a theoretical value of infinity with a constant speed input. While, as previously noted, such a speed range may be impractical, nevertheless, a relatively wide range may be obtained which is adequate for most practical applications. The variation in speed transmission ratio is obtained in the device shown by positioning control races 21 at various positions relative to spin sockets 31, thereby causing driving balls 32 to contact spin sockets 31 and driving race 21 at various points. A particularly convenient mechanism is provided for positioning races 21 by the use of adjuster ring 24 and adjuster balls 28 moving in mating cam surfaces 30 and 30' in adjuster 24 and races 21. While an adjusting screw 25 and a mating hobbed portion 26 of adjuster 24 are shown as a means of rotating adjuster 24 and cams 30 thereof relative to races 21 and cams 30' thereof, it will be obvious that other well-known devices may be employed to secure such relative motion. Furthermore, configurations of cam surfaces other than those shown herein may readily be employed in combination with other arrangements of adjuster balls.

It will be understood that in the device shown in Fig. 1 all thrust forces are contained within the transmission through the use of oppositely disposed driven cages 8 and 8' interconnected by torque tube 9. In other words, the transmission is in effect double-ended. It will be obvious that by providing suitable thrust bearings the device may readily be made single-ended or, in other words, the combination of single driving and control races and a single driven cage may be employed with corresponding single groups of driving balls and adjuster balls and associated cam surfaces.

In the arrangement described control races 21 are restrained from rotation relative to inner surface 17 by the use of studs 22 in slots 23 of races 21. There is, however, under most conditions a reaction in races 21 from rotary motion of balls 32. This reaction tends to cause rotation of races 21 in a direction opposite to the rotation of driving races 4, due to planetary differential action through balls 32. Any rotational motion of races 21 tends to cause motion of cam surfaces 30' relative to adjuster balls 28 and cam surfaces 30 in adjuster 24. Relative motion of cams 30 and 30' tends to cause outward axial motion of races 21, thereby tending automatically to increases the driving ratio between driving race 4 and driven cages 8 and 8' in proportion to the torque demanded by the driven or output shaft. Thus, by the simple modification of removing restraining studs 22 and permitting free "floating" of races 21, the transmission is made automatically torque-responsive so that with a constant input speed and variable torque demand the transmission instantly responds to furnish proper ratio and torque to supply a driven load within practical ratio limits of the transmission.

While I have shown and described a preferred embodiment of my invention, it will be understood that my invention may well take other forms and I, therefore, aim in the appended claim to cover all such changes and modifications as fall within the true spirit and scope of the invention.

What I claim as new and desire to secure by Letters Patent of the United States is:

In a power transmission device in combination a pair of oppositely disposed rotary driving races, a pair of oppositely disposed interconnected rotary driven members each having a plurality of spin sockets therein, a pair of oppositely disposed control race members each having a race and a plurality of cam surfaces therein, a plurality of driving balls arranged in distinct groups each associated with one of said driven members, said balls engaging said control races and being in spinning contact with said sockets, means to maintain said driving races in engagement with said balls, means to vary the positions of said control races relative to said sockets comprising an adjuster member interposed between said control race members and having a plurality of cam surfaces therein arranged to mate with said first-mentioned cam surfaces in said race members, a plurality of adjuster balls arranged to engage said mating cam surfaces, means to move said last-mentioned cam surfaces relative to said first-mentioned cam surfaces to vary the spacing between said adjuster and said control races, variation in the points of spinning contact of said driving balls in said sockets being effected by relative motion between said mating cam surfaces in engagement with said adjuster balls, and the speed ratio between said driving race and said driven member being varied in response to said last-mentioned variation.

HUGH M. STEPHENSON.

REFERENCES CITED

The following references are of record in the file of this patent:

UNITED STATES PATENTS

| Number | Name | Date |
| --- | --- | --- |
| 1,380,006 | Nielsen | May 31, 1921 |
| 1,585,140 | Erban | May 18, 1926 |
| 1,691,625 | Chilton | Nov. 13, 1928 |
| 1,718,846 | Arter | June 25, 1929 |
| 1,800,388 | Jacobsen | Apr. 14, 1931 |
| 2,005,949 | Morgan | June 25, 1935 |
| 2,349,981 | Mulder | May 30, 1944 |

FOREIGN PATENTS

| Number | Country | Date |
| --- | --- | --- |
| 474,289 | Great Britain | Oct. 25, 1937 |